United States Patent [19]

Kolb, Jr.

[11] 4,120,011
[45] Oct. 10, 1978

[54] MAGNETIC HEAD EMPLOYING EASY AXIS THIN FILM INDUCTOR

[75] Inventor: Frederick John Kolb, Jr., Rochester, N.Y.

[73] Assignee: Eastman Kodak Company, Rochester, N.Y.

[21] Appl. No.: 835,106

[22] Filed: Sep. 21, 1977

[51] Int. Cl.² ............................................. G11B 5/30
[52] U.S. Cl. ................................... 360/111; 360/125
[58] Field of Search ........................... 360/111–113, 360/122, 125; 324/43 R, 0.5 R

[56] References Cited

U.S. PATENT DOCUMENTS

| | | | |
|---|---|---|---|
| 3,239,754 | 3/1966 | Odom, Jr. et al. | 324/0.5 R X |
| 3,271,665 | 9/1966 | Castro et al. | 324/43 R |
| 3,369,083 | 2/1968 | Clapper et al. | 360/122 X |
| 3,443,213 | 5/1969 | Bader et al. | 324/43 R |
| 3,829,894 | 8/1974 | Watanabe | 360/111 |

Primary Examiner—John H. Wolff
Attorney, Agent, or Firm—Robert F. Cody

[57] ABSTRACT

A flux-sensitive magnetic head employs, at its back part, a structure having a thin single domain magnetic film coated thereon. A first coil wraps around the coated structure; and a second coil wraps around one pole of the head. A direct current is passed through the second coil, thereby to apply an easy axis magnetic bias to the film. By appropriately contouring the back gap of the head, signal flux appearing at the head front gap asserts a differential magnetic force to the easy axis of the film, thereby causing the inductance of the first coil to vary detectably.

4 Claims, 8 Drawing Figures

U.S. Patent  Oct. 10, 1978  4,120,011
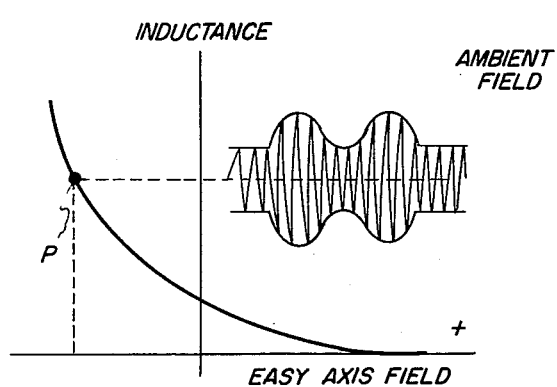
FIG. 1
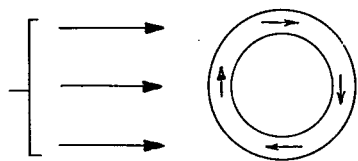
FIG. 2a
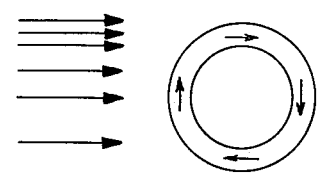
FIG. 2b
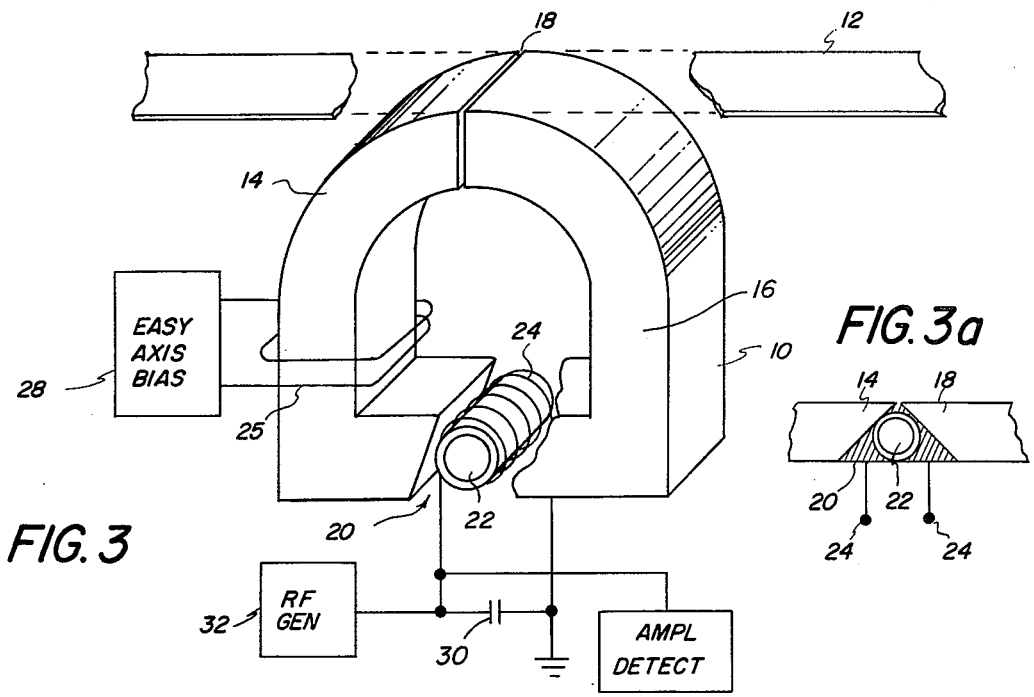
FIG. 3
FIG. 3a
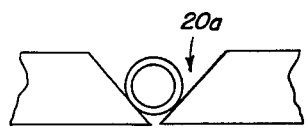
FIG. 4a
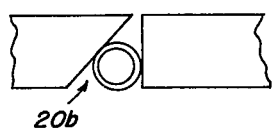
FIG. 4b
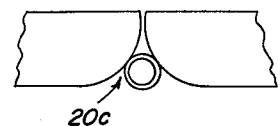
FIG. 4c

MAGNETIC HEAD EMPLOYING EASY AXIS THIN FILM INDUCTOR

BACKGROUND OF THE INVENTION

1. Field of the Invention

This invention relates in general to magnetic heads and in particular to magnetic heads of the flux-sensitive type.

2. Description Relative to the Prior Art

The playback of recorded signals from magnetic tape, or the like, using a conventional magnetic head that is sensitive to flux rate-of-change is difficult at low signal frequencies, and theoretically impossible for dc signals, or when there is no relative head-to-tape motion. Various techniques have been proposed for sensing tape flux, as opposed to the rate-of-change of flux (viz Hall effect devices; flux gate devices; etc.). The invention, as will be described below, employs a "single domain" thin magnetic film structure, say, one plated with permalloy to a thickness less than about three microns.

Thin film magnetometers have been described in the literature, and in a number of patents:

"Recent Advances in the Thin Film Inductance Variation Magnetometer", C. J. Bader and C. S. DeRenzi, Intermag, 1974, IEEE;

IEEE Transactions on Magnetics, Vol. Mag-8, #1, March 1972, "Magnetic Thin-film Magnetometers for Magnetic-Field Measurement", H. Irons and L. Schwee;

U.S. Pat. No. 2,856,581, issued in 1958 to L. Alldredge;

U.S. Pat. No. 3,012,177, issued in 1961 to H. Mortimer;

U.S. Pat. No. 3,239,754, issued in 1966 to W. Odom, Jr.; and

U.S. Pat. No. 3,271,665, issued in 1966 to P. Castro.

Of particular interest is the above-noted article by Bader and DeRenzi. While Bader and DeRenzi indicate that easy axis inductance varies monotonically for various values of applied easy axis field, it is apparent that circumferentially polarized thin films are insensitive to ambient easy axis fields because such fields have no net effect on such films.

SUMMARY OF THE INVENTION

The present invention is directed to the measurement of signal flux via "inductance variations". More specifically, the invention teaches that, by contouring appropriately the back gap of a magnetic head, the easy axis of a thin film element having a circumferential easy magnetization axis may be employed to sense flux appearing at the front gap of the head. Such a tack also permits selective bias to be applied to the film easy axis, thereby to set the sensitivity of the head to signal flux. In one form of the invention, the back gap of a magnetic head is provided with a wedge-shaped cross-section; and a thin film coated wire, having a circumferential easy axis, is laid along the wedge-shaped back gap, the thin film coated wire being inductively coupled to a coil. Because of the contoured back gap, signal flux appearing at the front gap of the head is differentially applied to the film of the wire, causing the inductance of the coil to vary accordingly. Without such contouring of the head back gap, a differential field is not applied to the thin film element and, corollarily, the inductance variation (as a function of easy axis field) predicted by Bader and DeRenzi, would not be attainable. Such inductance variation provides a ready means of producing electrical signals corresponding to the signal flux.

The invention will be further described with reference to the Figures, wherein:

FIGS. 1 and 2a, 2b are diagrams useful in describing the invention,

FIGS. 3, 3a are schematic diagrams, partially in perspective, of apparatus embodying the invention, and FIGS. 4a, 4b, 4c are views of other embodiments of the invention.

Referring now to FIG. 1, the easy axis inductance of a thin single domain magnetic film is depicted as being monotonically variable as a function of the applied easy axis field. For a thin single domain film which closes on itself, however, — as for example a circumferential thin film coated on a wire while the wire carries a current — the easy axis of such a film is ordinarily insensitive to ambient fields. This is because ambient fields have no net effect on the dipoles of such a film. (See FIG. 2a.) To employ the high sensitivity of easy axis flux sensing, inherently depicted by FIG. 1, while increasing the flux gathering capability of a head employing a single domain thin film magnetically coated sense wire, the present invention contours the back gap of the head, thereby to produce a gradient field within the head back gap. (See FIG. 2b.)

With the above as background, reference should now be made to FIG. 3 which shows a magnetic head 10 in contact with a magnetic tape 12. The head 10 has magnetic pole pieces 14, 16 which define a transducer gap 18, the head being provided with a wedge-shaped back gap 20. A thin film structure 22 — say, a wire upon which a thin film was deposited while the wire conducted a current — is laid along the length of the wedge-shaped gap 20 and completes a magnetic circuit from one pole piece to the other. A coil 24 wraps around the film structure 22. (A suitable potting material may fill the wedge-shaped gap as depicted in FIG. 3a.)

Although an easy axis magnetic bias $H_B$ (FIG. 1) may be applied to the film structure in a variety of ways — it has been found convenient to apply an easy axis bias field to the film by passing a direct current 28 through a coil 25 wound about a pole piece 14 of the head. Such a bias establishes a quiescent inductance for the coil as indicated by the point P of FIG. 1.

A capacitor 30 may be connected across the coil 24, thereby forming a tank circuit. The capacitor 30 has a capacitance which may be such that the resonant frequency of the tank circuit is below the frequency of, say, an RF excitation 32 applied to the tank circuit. Thus, in the absence of signal fields appearing in the head gap 18, the voltage developed across the tank circuit varies at the RF excitation rate. As signal flux appears in the head gap 18, it "gradiently" affects the thin film or sense wire 22, thereby causing the inductance of the coil 24 to vary in accordance with the signal flux. Such varying inductance causes the voltage across the tank circuit to appear as an amplitude modulated voltage proportional to the signal flux strength, the modulated voltage being detectable by means known to the art.

Although the apparatus of FIG. 3 depicts an arrangement for AM detection of signals corresponding to the signal flux appearing at the head gap 18, the invention may also be incorporated in other modes of operation, including FM. For example, the coil 24 may comprise the inductor, say, of the tank circuit of a Colpitts oscillator, the frequency of which will increase and decrease as a function of the signal flux. Such being the case, an FM demodulator adapted to receive the oscillator output, would provide an output voltage proportional to the signal flux.

The invention has been described in detail with particular reference to a certain preferred embodiment thereof, but it will be understood that variations and modifications can be effected within the spirit and scope of the invention. For example, as shown in FIGS. 4a, 4b, 4c, the invention may employ other shaped back gaps (and/or materials) to effect a gradient field. And, while the element 22 is depicted as a magnetically coated wire, it will be appreciated that the thin film element may, in fact, be a magnetically coated nonconductor, say of any of a variety of cross-sections. Or, if preferred, several thin film elements may be accommodated in the back gap.

What is claimed is:

1. Magnetic head apparatus for use in detecting signal flux comprising:
   a. first and second magnetic pole pieces disposed to form a transducer gap and a back gap therebetween;
   b. wedge-like means at said back gap for providing a gradually changing reluctance across said back gap;
   c. elongated sense element means within said back gap, said sense element means having an essentially single domain magnetic film thereon, said film being magnetically coupled to said pole pieces for completing a magnetic circuit comprising said pole pieces, said transducer gap, and said film, said film being so disposed on said sense element means that the easy axis of said film is about the longitudinal axis of said sense element means and also substantially parallel to said transucer gap, said sense element means being disposed within said back gap said head apparatus being adapted to have a bias field applied across said back gap, the field extending across said back gap being applied differentially to the easy axis of said film; and
   d. a sense coil inductively coupled to the easy axis of said sense element means;

whereby signal flux entering said transducer gap correspondingly causes the inductance of said sense coil to vary, and whereby variation in said sense coil inductance may be converted to an electrical signal corresponding to said inductance variation.

2. The apparatus of claim 1 wherein said sense element means is a wire having a magnetic film coated thereon.

3. The apparatus of claim 1 including means for applying a bias field across said back gap.

4. The apparatus of claim 1 wherein said means at said back gap for providing a gradually changing reluctance across said back gap comprises the parts of said first and second pole pieces which form said back gap, said parts being contoured so as to provide a varying dimension across said back gap.

* * * * *

UNITED STATES PATENT OFFICE
CERTIFICATE OF CORRECTION

PATENT NO. : 4,120,011
DATED : October 10, 1978
INVENTOR(S) : Frederick J. Kolb, Jr.

It is certified that error appears in the above–identified patent and that said Letters Patent are hereby corrected as shown below:

Col. 4, line 5, delete "and" and insert after "means" --, the length of said sense element means being--;

line 6, after "gap," delete "said sense ele-";

delete line 7.

Signed and Sealed this

Twenty-second Day of May 1979

[SEAL]

Attest:

RUTH C. MASON
*Attesting Officer*

DONALD W. BANNER
*Commissioner of Patents and Trademarks*